US012591795B2

(12) United States Patent
 Kim et al.

(10) Patent No.: US 12,591,795 B2
(45) Date of Patent: Mar. 31, 2026

(54) METHOD FOR PROVIDING EXPLAINABLE ARTIFICIAL INTELLIGENCE

(71) Applicant: SAMSUNG SDS CO., LTD., Seoul (KR)

(72) Inventors: Young Jun Kim, Seoul (KR); Jae Sun Shin, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 992 days.

(21) Appl. No.: 17/533,285

(22) Filed: Nov. 23, 2021

(65) Prior Publication Data

US 2022/0164687 A1 May 26, 2022

(30) Foreign Application Priority Data

Nov. 26, 2020 (KR) ........................ 10-2020-0161557

(51) Int. Cl.
 *G06N 5/045* (2023.01)
 *G06F 18/2413* (2023.01)
 *G06F 18/28* (2023.01)
(52) U.S. Cl.
 CPC ......... *G06N 5/045* (2013.01); *G06F 18/2413* (2023.01); *G06F 18/28* (2023.01)
(58) Field of Classification Search
 CPC .... G06N 5/045; G06N 20/00; G06F 18/2413; G06F 18/28; G06V 10/993
 See application file for complete search history.

(56) References Cited

U.S. PATENT DOCUMENTS

| | | | |
|---|---|---|---|
| 10,574,512 B1 | 2/2020 | Mermoud et al. | |
| 11,562,180 B2 * | 1/2023 | Nushi .................... | G06N 5/045 |
| 11,775,857 B2 * | 10/2023 | Ramachandra Iyer ...................... | |
| | | | G06N 5/045 |
| | | | 706/12 |
| 11,928,558 B1 * | 3/2024 | Joshi ...................... | G06N 20/00 |

(Continued)

FOREIGN PATENT DOCUMENTS

| | | | | |
|---|---|---|---|---|
| DE | 102019135474 A1 * | 7/2020 | ............. | G06N 3/045 |
| JP | 4059014 B2 | 3/2008 | | |

(Continued)

OTHER PUBLICATIONS

MT Ribeiro, S Singh, C Guestrin, "Why should i trust you?" Explaining the predictions of any classifier, 2016, Association for Computing Machinery, https://doi.org/10.1145/2939672.2939778 (Year: 2016).*

(Continued)

*Primary Examiner* — Chau T Nguyen
(74) *Attorney, Agent, or Firm* — Sughrue Mion, PLLC

(57) ABSTRACT

A method performed on a computing device for providing explainable artificial intelligence (XAI) according to an embodiment of the present disclosure includes configuring a first set of prototypes representing each data instance of an entire dataset input to a machine-learned model, configuring a second set of criticisms that are samples of data instances not expressed by the prototypes among each data instance of the entire dataset, and calculating a first feature based rationale of output data for a first data instance of the model by considering all prototypes included in the first set and all criticisms included in the second set.

10 Claims, 8 Drawing Sheets

(56) References Cited

U.S. PATENT DOCUMENTS

| | | | |
|---|---|---|---|
| 2015/0379368 A1* | 12/2015 | Shiiyama | G06F 16/434 |
| | | | 382/201 |
| 2019/0370697 A1* | 12/2019 | Ramachandra Iyer | |
| | | | G06F 18/285 |
| 2020/0143005 A1 | 5/2020 | Nair et al. | |
| 2020/0184278 A1 | 6/2020 | Zadeh et al. | |
| 2020/0257925 A1* | 8/2020 | Kuwajima | G06F 18/2113 |
| 2020/0294231 A1 | 9/2020 | Tosun et al. | |
| 2021/0192280 A1* | 6/2021 | Zhang | G06N 20/20 |
| 2022/0100850 A1* | 3/2022 | Sun | G06N 20/00 |

FOREIGN PATENT DOCUMENTS

| | | | | |
|---|---|---|---|---|
| WO | WO 2020/037055 A1 | 2/2020 | | |
| WO | WO-2020089597 A1 * | 5/2020 | | G06N 5/048 |
| WO | WO-2020182706 A1 * | 9/2020 | | G06N 3/042 |

OTHER PUBLICATIONS

StackExchange, Normalization when Max and Min Values are Reversed, 2016, Question and 1st answer, https://stats.stackexchange.com/questions/252455/normalization-when-max-and-min-values-are-reversed (Year: 2016).*

Xiao-Hui Li; Caleb Chen Cao; Yuhan Shi; Wei Bai; Han Gao; Luyu Qiu, A Survey of Data-Driven and Knowledge-Aware explainable AI, Mar. 30, 2020, IEEE, https://doi.org/10.1109/TKDE.2020.2983930 (Year: 2020).*

Doshi Kshitij, "Assignment and Quantification of the Influence of Features of Neuronal Networks for Explainable Artificial Intelligence", published on Jul. 30, 2020, Document ID: DE-102019135474-A1 (Year: 2020).*

Yong-Geon Lee et al., "Interpretation of Load Forecasting Using Explainable Artificial Intelligence Techniques", The Transactions of the Korean Institute of Electrical Engineers, vol. 69, No. 3, p. 480-485, 2020 (English Abstract is included in the first page.).

Been Kim E et al., "Examples are not Enough, Learn to Criticize! Criticism for Interpretability", 30th Conference on Neural Information Processing Systems (NIPS 2016), Barcelona, Spain.

Been Kim et al., "Examples are not Enough, Learn to Criticize! Criticism for Interpretability", 30th Conference on Neural Information Processing Systems (NIPS 2016), Barcelona, Spain, Dec. 5, 2016, 9 pages.

Karthik. S. Gurumoorthy et al., "Efficient Data Representation by Selecting Prototypes with Importance Weights", 2019 IEEE International Conference on Data Mining (ICDM), Beijing, China, arXiv:1707.01212v4 [stat.ML], Aug. 12, 2019, pp. 260-269, doi: 10.1109/ICDM.2019.00036.

Marco Tulio Ribeiro et al., ""Why Should I Trust You?": Explaining the Predictions of Any Classifier", KDD '16: Proceedings of the 22nd ACM SIGKDD International Conference on Knowledge Discovery and Data Mining, Aug. 13, 2016, pp. 1135-1144, https://doi.org/10.1145/2939672.2939778.

Office Action issued Sep. 26, 2025 by the Korean Patent Office for KR Patent Application No. 10-2020-0161557.

* cited by examiner

FIG. 3

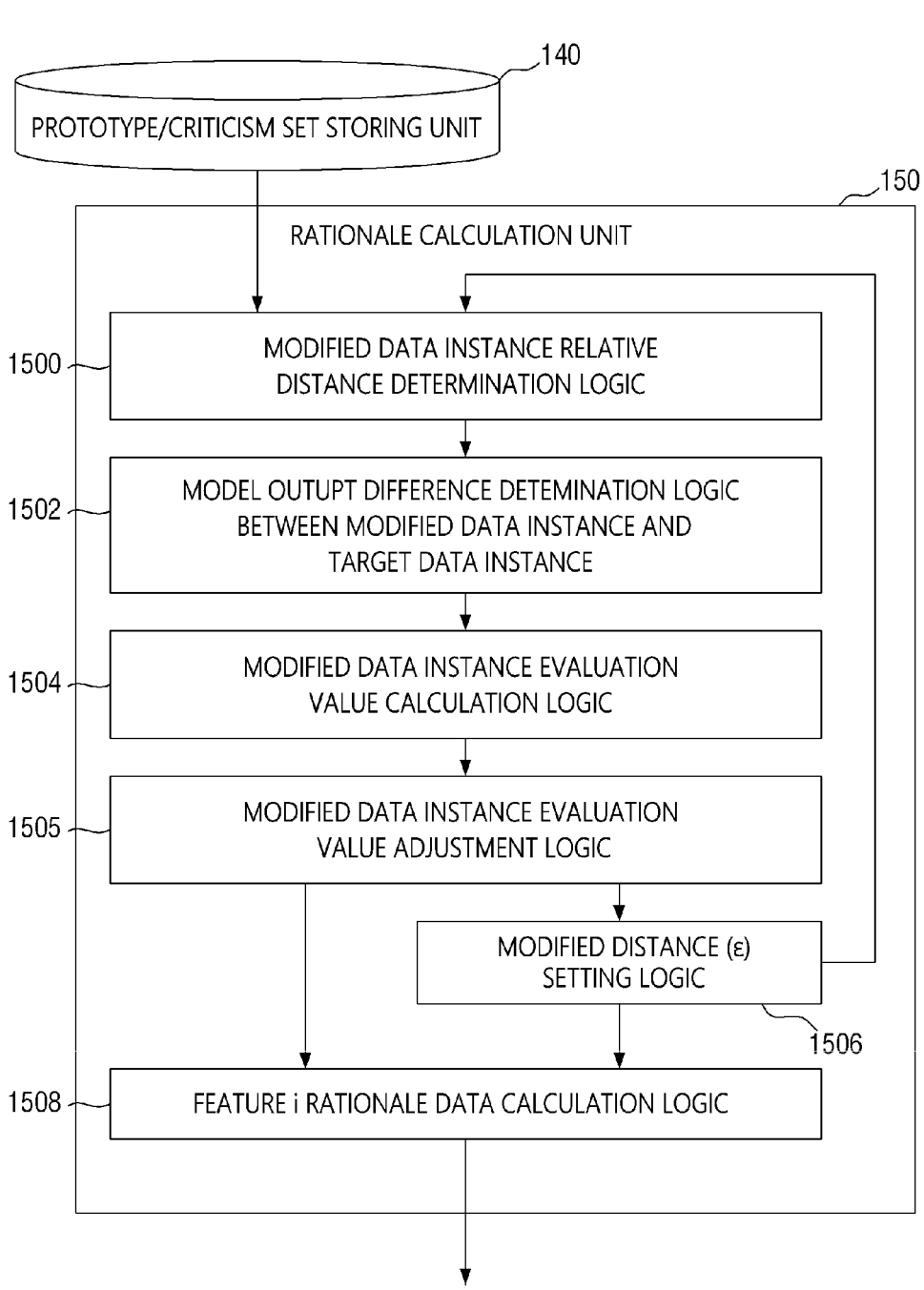

PROTOTYPE/CRITICISM SET STORING UNIT ~140

RATIONALE CALCULATION UNIT ~150

1500 — MODIFIED DATA INSTANCE RELATIVE DISTANCE DETERMINATION LOGIC

1502 — MODEL OUTUPT DIFFERENCE DETEMINATION LOGIC BETWEEN MODIFIED DATA INSTANCE AND TARGET DATA INSTANCE

1504 — MODIFIED DATA INSTANCE EVALUATION VALUE CALCULATION LOGIC

1505 — MODIFIED DATA INSTANCE EVALUATION VALUE ADJUSTMENT LOGIC

MODIFIED DISTANCE ($\varepsilon$) SETTING LOGIC ~1506

1508 — FEATURE i RATIONALE DATA CALCULATION LOGIC

METHOD FOR PROVIDING EXPLAINABLE ARTIFICIAL INTELLIGENCE

PRIORITY

This application claims the benefit of Korean Patent Application No. 10-2020-0161557, filed on Nov. 26, 2020, in the Korean Intellectual Property Office, the disclosure of which is incorporated herein by reference in its entirety.

BACKGROUND

1. Field

The present disclosure relates to a method for providing explainable artificial intelligence and a computing device, to which the method is applied. More specifically, it relates to, in the generation of the result data output by the machine-learned model for the target data instance, a method for providing information on the rationale about which feature had influence, and an apparatus, to which the method is applied.

2. Description of the Related Art

Artificial intelligence is rapidly developing and is being used for various purposes in almost every field. However, it is mostly a black-box situation where it is impossible to explain the reason for the results output by the trained model. Accordingly, issues related to fairness, reliability, and accuracy of conclusions made based on artificial intelligence technology are raised. In order to help understanding the rationale related to the results output from the artificial intelligence technology, an explainable artificial intelligence (eXplainable Artificial Intelligence; XAI) technology is being provided.

Explainable artificial intelligence technology includes technology for identifying AI thinking and technology for expressing the content of AI thinking in an easy-to-understand manner for humans. In the technology for identifying AI thinking, individual conditional expectations (ICE) finds the weight of factors that AI considers by analyzing the response values while giving a single input value to AI. As another example, partial dependence plots (PDP) analyzes response values by giving multiple input values to AI. Others include sensitivity analysis, additive factor analysis (SHAP), and partial interpretation models (LIME), etc. In addition, the technology for expressing the content of AI thinking in an easy-to-understand manner for human expresses the thinking of AI in images or natural language so that humans can understand it.

The identification of AI thinking through XAI can be largely divided into global interpretation and local interpretation. Global interpretation aims to understand the full logic of the model trained using all the data. However, if the complexity of the learning model exceeds a certain level, it has a limitation that it becomes very difficult to practically use the global interpretation model. On the other hand, local interpretation aims to make inferences about the results derived for a single prediction of a specific instance. It is possible to make more accurate inferences than global interpretation, and it is generally useful to identify the process of derivation of the prediction result of a specific instance of interest from the point of view of an actual user.

Existing methodologies for identifying AI thinking can be largely divided into 1) checking changes in prediction results through changes in input values, 2) calculating errors for input values through back-propagation, or 3) extracting representative instance data. In case 1), the instability may be high depending on the sampling method, and in case 2), the application is limited to deep learning-based models, and there is a problem that an appropriate baseline needs to be set in advance. Also, in 3), it is possible to explain the input data, but it is difficult to derive an interpretation of the learned model.

In addition, in the case of existing algorithms such as LIME and Integrated Gradients, in a model such as min ($x_1$, $x_2$), the influence of a variable with a large value is calculated as 0, so it can be seen that the influence of the corresponding variable does not exist at all.

In addition, some existing AI thinking identification methods are introduced.

A perturbation-based model is provided. This technology is a technique to explain the behavior of the basic model by disturbing the input value and checking how the prediction changes, and LIME and Influence Functions are representative ones. This technique has a high instability because there is a possibility that a completely different interpretation may be derived depending on the sampling process, and it has limitations in that it is difficult to apply to high-dimensional data.

A backward propagation-based model is provided. This technique is mainly used for ex post explanation of deep learning models, and it indicates the importance of each feature by calculating the degree of error for the input value through backward propagation. Representative techniques include LRP, SmoothGrad, DeepLIFT, and Integrated Gradients. These techniques are applicable only to deep networks, and in most cases, there is a limitation in that they are very dependent on a baseline that the user should define appropriately in advance. Also, it may be vulnerable to an adversarial attack that intentionally degrades performance.

An example-based model is provided. This technique is to describe the entire dataset or machine learning model by selecting specific instances from the dataset. Typically, Prototype-Criticism technique extracts a prototype representing a dataset and a criticism, which is an instance that cannot be expressed only with the prototype. Although this technique can explain the entire dataset, it has a limitation in that it is impossible to interpret the trained model.

SUMMARY

A technical object to be achieved through some embodiments of the present disclosure is to provide a method for providing information about a key feature that had influence on the output of a target data instance of a machine-learned model.

Another technical object to be achieved through some embodiments of the present disclosure is to provide a method that considers both the local interpretation around a target data instance and the distribution of all data instances, in providing information about a key feature that had influence on the output of a target data instance of a machine-learned model.

Another technical object to be achieved through some embodiments of the present disclosure is to provide an artificial intelligence providing method that outputs the thinking results for the target data instance based on artificial intelligence technology, but additionally outputs information on at least one of a key feature that had influence on the output result and a feature that had influence little on the output result, and an apparatus, to which the method is applied.

The technical objects of the present disclosure are not limited to the technical objects mentioned above, and other technical objects not mentioned will be clearly understood by those skilled in the art from the following description.

According to an aspect of the inventive concept, there is provided a method performed on a computing device for providing explainable artificial intelligence (XAI). The method includes configuring a first set of prototypes representing each data instance of an entire dataset input to a machine-learned model, configuring a second set of criticisms that are samples of data instances not expressed by the prototypes among each data instance of the entire dataset, and calculating a first feature based rationale of output data for a first data instance of the model by considering all prototypes included in the first set and all criticisms included in the second set.

Configuring the first set may include configuring a first set including prototypes of a number corresponding to a first ratio of a number of data instances of the entire dataset, wherein configuring the second set includes, repeating adding a criticism to the second set until criticisms of a number corresponding to a second ratio of a number of prototypes in the first set is included in the second set, or an evaluation value of the second set calculated using a kernel matrix of the entire dataset is less than or equal to a threshold.

Calculating the first feature based rationale may include, calculating a relative distance between data points that all prototypes of the first set and all criticisms of the second set form on a feature space, and a data point of a modified data instance, in which a value of the first feature among features of the first data instance is increased by E, calculating a difference between output data for the first data instance of the model and output data for the modified data instance of the model, calculating an evaluation value for the modified data instance by aggregating the relative distance and the difference, calculating a plurality of evaluation values by repeating calculating the relative distance while changing the E, calculating the difference, and calculating the evaluation value, and calculating influence of the first feature on output data for the first data instance of the model by aggregating the plurality of evaluation values.

Calculating the first feature based rationale may further include calculating the first feature based rationale by scaling the calculated influence of the first feature using influence of all features.

Calculating a plurality of evaluation values by repeating calculating the relative distance while changing the E, calculating the difference, and calculating the evaluation value may include calculating a plurality of evaluation values by repeating calculating the relative distance while changing the ε in a range between (MIN−(value of first feature of first data instance))/(MAX−MIN) and (MAX−(value of first feature of first data instance))/(MAX−MIN), calculating the difference, and calculating the evaluation value, wherein the MAX is a maximum value of values of the first feature of data instances of the entire dataset, and the MIN is a minimum value of values of the first feature of data instances of the entire dataset.

Calculating an evaluation value for the modified data instance may include calculating an adjusted evaluation value by adjusting the calculated evaluation value so that the calculated evaluation value decreases as the ε increases, wherein calculating the plurality of evaluation values includes, calculating a plurality of adjusted evaluation values by repeating calculating the relative distance while changing the E, calculating the difference, and calculating the adjusted evaluation value, wherein calculating influence of the first feature on output data for the first data instance of the model by aggregating the plurality of evaluation values includes, calculating influence of the first feature on output data for the first data instance of the model by aggregating the plurality of adjusted evaluation values.

Calculating the first feature based rationale may include calculating a relative distance between data points that all prototypes of the first set and all criticisms of the second set form on a feature space, and a data point of a modified data instance, in which a value of the first feature among features of the first data instance is increased by E, calculating a difference between output data for the first data instance of the model and output data for the modified data instance of the model, and calculating an integral value for the ε of an evaluation value for the modified data instance calculated using the relative distance and the difference as influence of the first feature on output data for the first data instance of the model.

Calculating an integral value for the ε of an evaluation value for the modified data instance calculated using the relative distance and the difference as influence of the first feature on output data for the first data instance of the model may include calculating an integral value for the ε of an evaluation value for the modified data instance in a range between (MIN−(value of first feature of first data instance))/(MAX−MIN) and (MAX−(value of first feature of first data instance)/(MAX−MIN).

Calculating an integral value for the ε of an evaluation value for the modified data instance calculated using the relative distance and the difference as influence of the first feature on output data for the first data instance of the model may include calculating an integral value for the ε of an adjusted evaluation value adjusted so that an evaluation value for the modified data instance decreases as the ε increases.

The method may further include generating determination result content for the first data instance by using data output for the first data instance by the model, generating rationale content for the determination result by using a first feature based rationale for the output data, and generating data of an output screen including the determination result content and the rationale content.

The first feature may be one of top features selected in order of larger value of the rationale for the first data instance among all features of the entire dataset.

According to an aspect of the inventive concept, there is provided an apparatus for providing explainable artificial intelligence. The apparatus includes one or more processors, a memory for loading a computer program executed by the processor and data of a machine-learned model, and a storage for storing the computer program, wherein the computer program includes, an instruction for configuring a first set of prototypes representing each data instance of an entire dataset input to the model, an instruction for configuring a second set of criticisms that are samples of data instances not expressed by the prototypes among each data instance of the entire dataset, and an instruction for calculating a first feature based rationale for output data for a first data instance of the model by considering all prototypes included in the first set and all criticisms included in the second set.

BRIEF DESCRIPTION OF THE DRAWINGS

These and/or other aspects will become apparent and more readily appreciated from the following description of the embodiments, taken in conjunction with the accompanying drawings in which:

5

6

Figure 1:
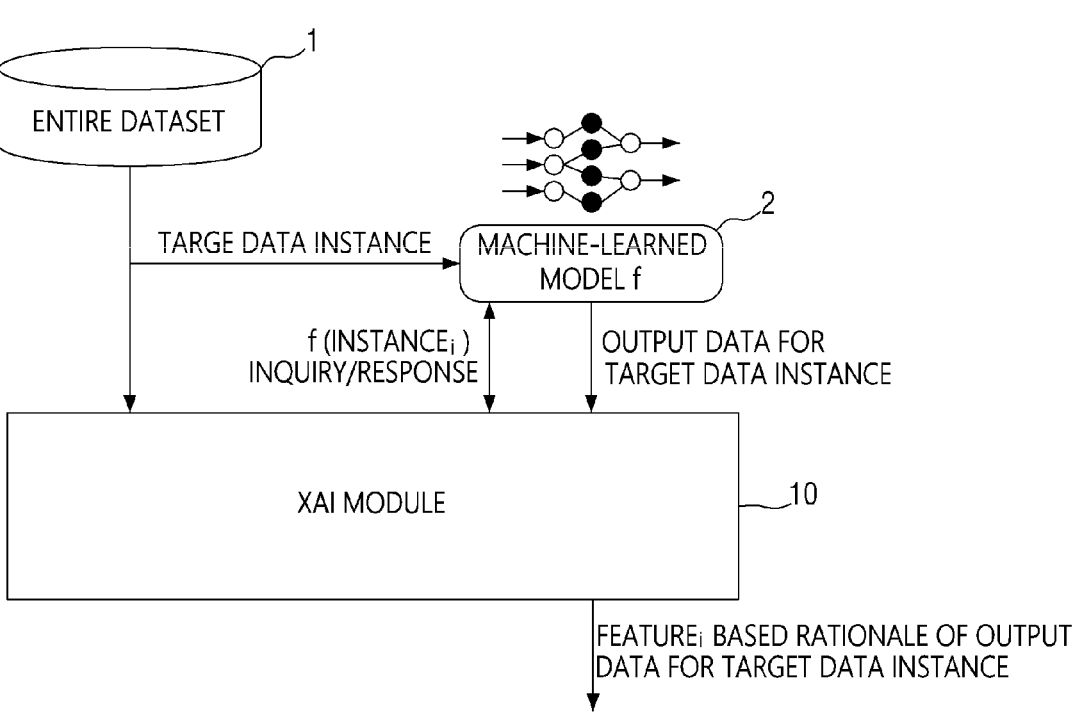
Figure 2:
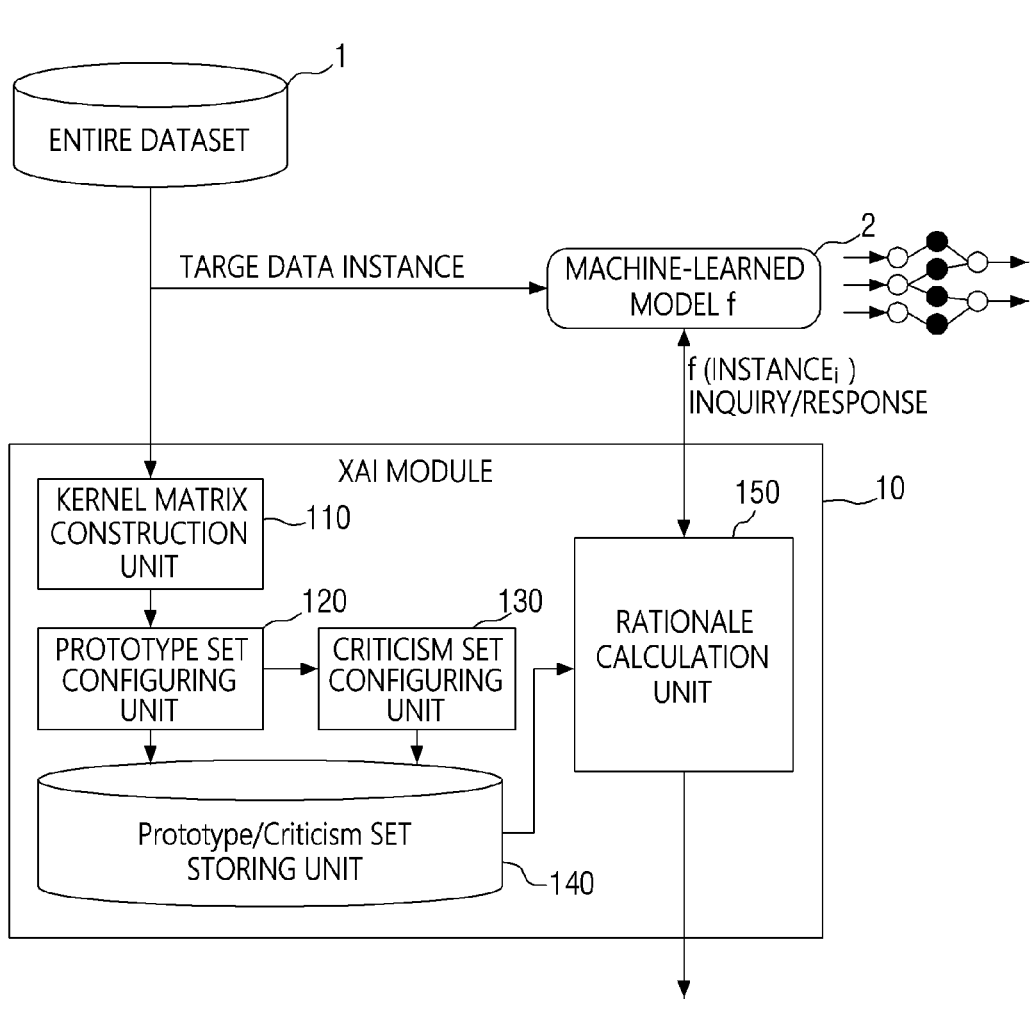
Figure 4:
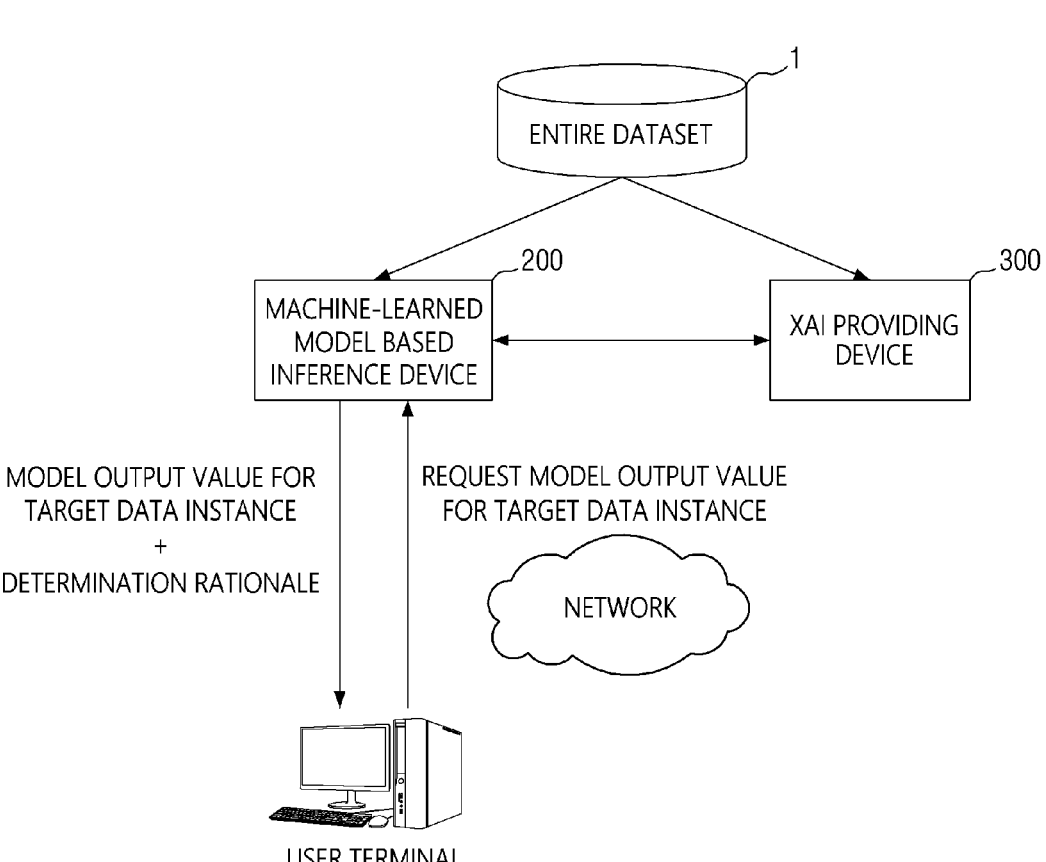
Figure 5:
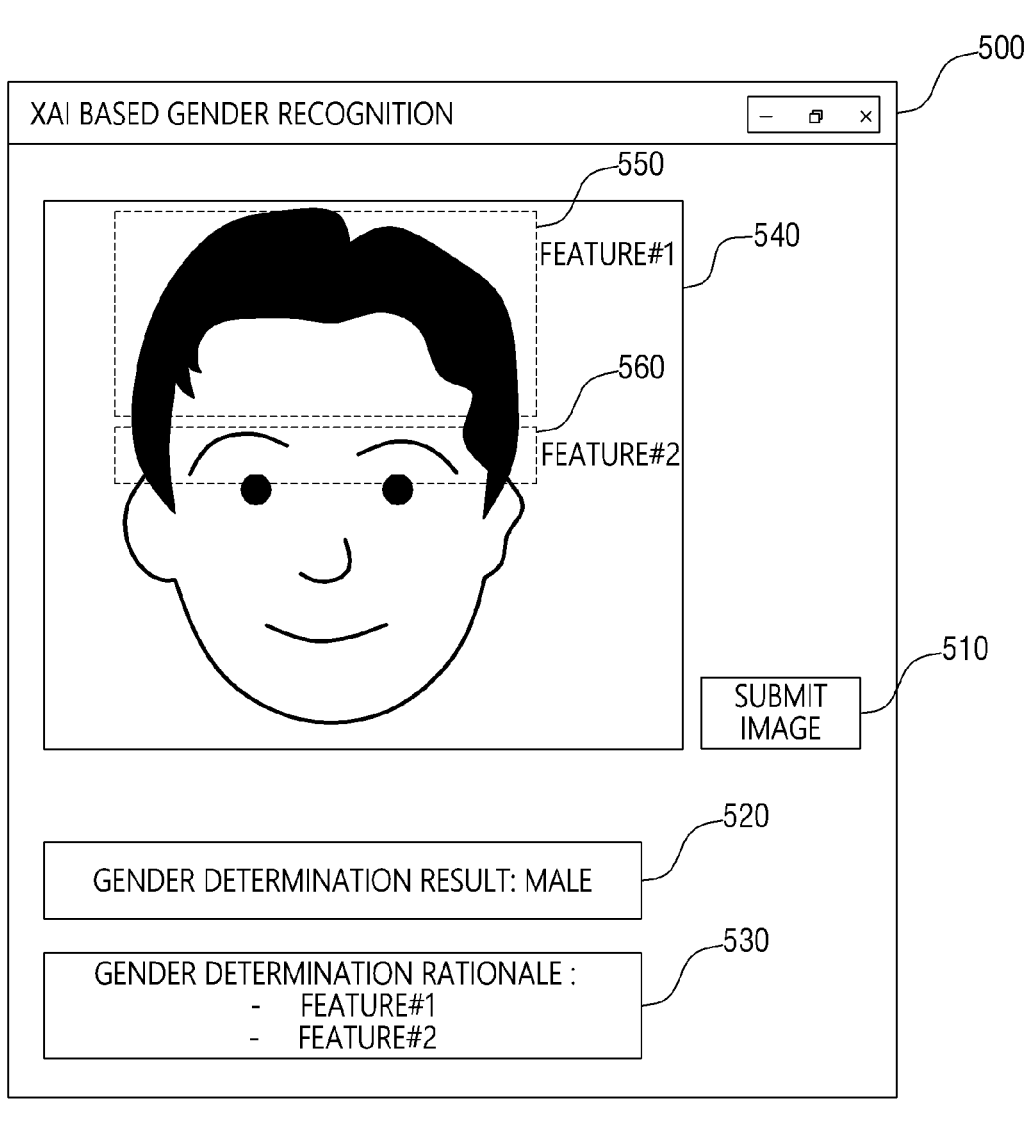
Figure 6:
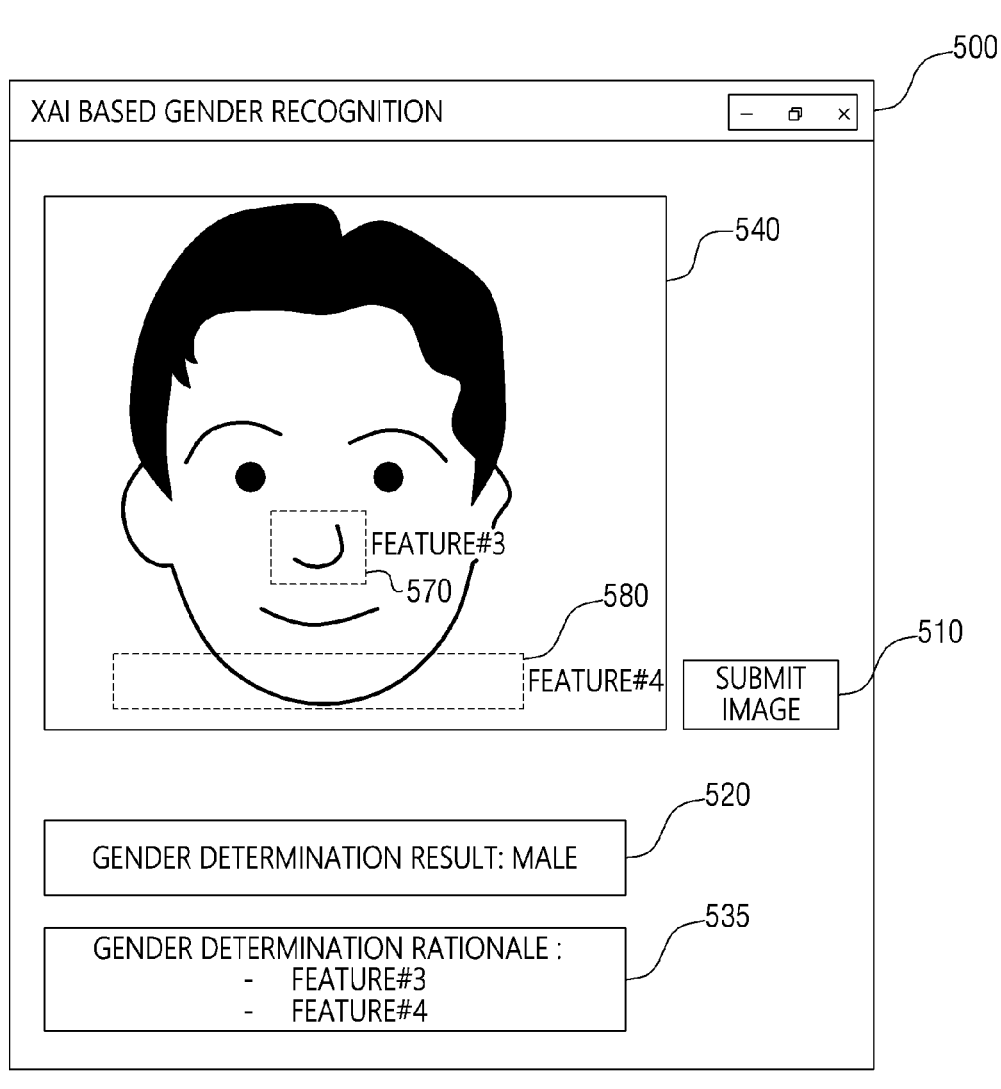
Figure 7:
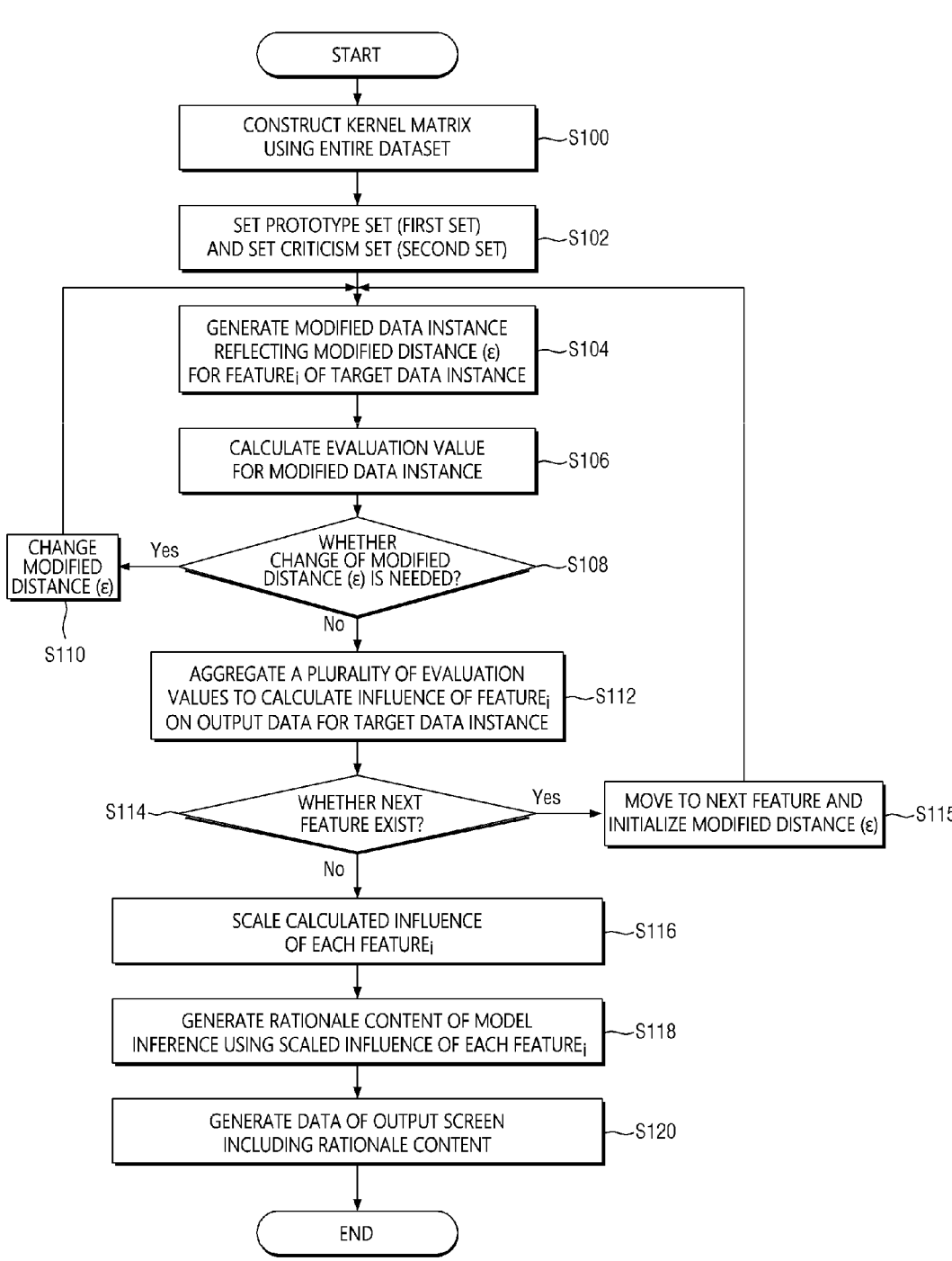
Figure 8:
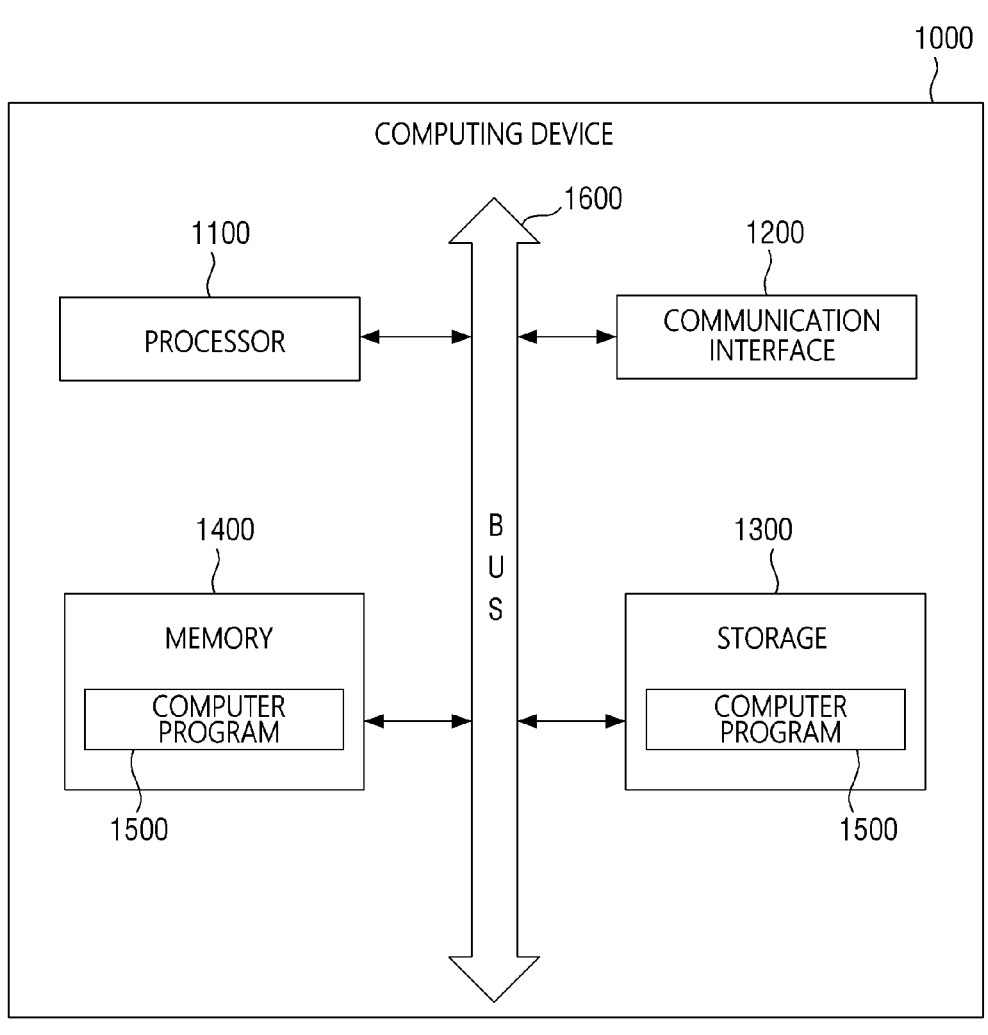

FIGS. 1 and 2 are block diagrams of an explainable artificial intelligence (XAI) providing system according to an embodiment of the present disclosure;

FIG. 3 is a block diagram for describing in more detail some components of FIGS. 1 and 2;

FIG. 4 is another configuration diagram of an explainable artificial intelligence providing system according to an embodiment of the present disclosure;

FIGS. 5 to 6 are exemplary views of an output screen that may be displayed on a screen of a user terminal in some embodiments of the present disclosure;

FIG. 7 is a flowchart of an explainable artificial intelligence providing method according to another embodiment of the present disclosure; and FIG. 8 is a diagram for describing a hardware configuration of an exemplary computing device according to some embodiments of the present disclosure.

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

First, configurations and operations of an explainable artificial intelligence providing system according to an embodiment of the present disclosure will be described with reference to FIGS. 1 to 4. Hereinafter, the explainable artificial intelligence providing system according to the present embodiment will be abbreviated as an XAI system. The XAI system according to this embodiment may include the XAI module 10. The XAI module 10 may be implemented as a hardware component or a software component of a computing device. In addition, the XAI module 10 may be implemented on a computing device in the form of a virtual machine or a container.

First, an operation of the XAI module 10 will be described with reference to FIG. 1.

The machine-learned model f(2) may be, for example, an artificial neural network-based model that is machine-learned using data instances of the entire dataset 1. Of course, the model f(2) may be machine-learned using a training dataset (not shown) separate from the entire dataset 1. The machine-learned model f(2) may be loaded into the same computing device as the computing device, in which the XAI module 10 is implemented.

When a specific data instance among a plurality of data instances included in the entire dataset 1 is input to the model f(2), the XAI module 10 may generate rationale data regarding which feature had influence on the data output from the model f(2). The rationale data may be generated in response to a rationale data request received from a user terminal (not shown) or may be generated in response to receiving output data for the specific data instance from the model f(2).

Hereinafter, for convenience of understanding, the specific data instance will be referred to as a 'target data instance.' In addition, 'data instance' refers to unit data that is an thinking target by model f(2). After pre-processing or feature extraction is performed on the unit data, a feature set, which is a set of a plurality of features of the unit data, is obtained. It may be understood that the data instance indicates the feature set.

The XAI module 10 may calculate a feature based rationale for the output data of the model f(2) for the target data instance. The feature based rationale may be understood as a numerical value indicating how much each feature had influence in determining the output data of the model f(2) for the target data instance.

In calculating the feature based rationale, the XAI module 10 is not limited to a local analysis of only analyzing a region adjacent to a data point of a target data instance on a feature space, but can additionally reflect a data instance distribution of the entire dataset 1.

To this end, the XAI module 10 may configure a first set of prototypes representing each data instance of the entire dataset input to the machine-learned model, configure a second set of criticisms, which are samples of data instances not expressed by the prototypes among each data instance of the entire dataset, and calculate each feature based rationale for the output data for the target data instance of the model f(2) by considering all prototypes included in the first set and all criticisms included in the second set.

The prototypes and the criticisms may be understood as samples of some of the data instances included in the entire dataset 1. A sample that can represent each data instance of the entire dataset is referred to as the prototype, and a sample expressing minor data instances, which do not represent each data instance of the entire dataset, is referred to as the criticism. Regarding prototype-criticism, the web documentation Molnar C., "Interpretable Machine Learning: A Guide for Making Black Box Models Explainable", Chapter 26 (2019), christophm.github.io/interpretable-ml-book/, may be referenced.

The XAI module 10 configures the first set of prototypes and the second set of criticisms into a number that can sufficiently express the data instance distribution of the entire dataset 1, and calculates each feature based rationale by considering all prototypes and all criticisms included in the configured first set and second set.

The XAI module 10 may calculate each feature based rationale. For example, if the data instance input to the model f(2) consists of N features, the XAI module 10 will calculate N feature based rationales.

Hereinafter, the operation of the XAI module 10 will be described in more detail with reference to FIG. 2.

As shown in FIG. 2, the XAI module 10 may include a kernel matrix construction unit 110, a prototype set configuring unit 120, a criticism set configuring unit 130, a prototype/criticism set storing unit 140, and a rationale calculation unit 150. Each of the components 110, 120, 130, 140, and 150 may be implemented as each functional unit of software, and may be executed on a processor to be described with reference to FIG. 8. Hereinafter, the operation of each component will be described.

First, the operations of the kernel matrix construction unit 110, the prototype set configuring unit 120, the criticism set configuring unit 130, and the prototype/criticism set storing unit 140 will be described. The kernel matrix construction unit 110, the prototype set configuring unit 120, the criticism set configuring unit 130, and the prototype/criticism set storing unit 140 configure a prototype set (the first set) and a criticism set (the second set) representing the global distribution of data instances of the entire dataset 1 on the feature space. The prototype set (first set) and criticism set (second set) will be reflected in the feature based rationale calculation.

The kernel matrix construction unit 110 measures a pairwise distance between data instances for all data instances of the entire dataset 1, and applies a kernel function to the measured distance to construct a kernel matrix. The distance between data instances may be, for example, a Euclidean distance or a Gower distance between points of each data instance formed on a feature space. A method of calculating the distance between the data instances may be determined according to the data type of the entire dataset 1.

The kernel matrix construction operation of the kernel matrix construction unit 110 may be implemented with reference to Equations 1 to 2 below. For reference, Equation 1 is a notation for the description presented throughout this specification.

[Equation 1]

<Notation>

X: the original dataset $X_S$: the subset of X whose indices are in an index set S n: the number of instances of X

[n]: $\{1, 2, \ldots, n\}$, the index set from 1 to n $\mathcal{F}$: a hypothesis space k(·, ·): a kernel function max(i): the maximum of the i-th feature in X min(i): the minimum of the i-th feature in X $e_i$: the i-th standard bask vector <Basic Equations>　　　　　　　　　　　　　　[Equation 2]

For an index set S with $m = |S|$, define $$J_b(S) = \frac{1}{n^2} \sum_{x_i, x_j \in X} k(x_i, x_j) - MMD^2(F, X, X_S), \text{ where}$$

$$MMD^2(F, X, X_S) = \frac{1}{n^2} \sum_{x_i, x_j \in X} k(x_i, x_j) -$$

$$\frac{2}{nm} \sum_{x_i \in X, z_j \in X_S} k(x_i, z_j) + \frac{1}{m^2} \sum_{z_i, z_j \in X_S} k(z_i, z_j).$$

Moreover, we define $L(C) =$ $$\sum_{z_j \in X_S} \left| \frac{1}{n} \sum_{x_i \in X} k(x_i, z_j) - \frac{1}{m} \sum_{p_r \in X_S} k(p_r, z_j) \right|, \text{ and}$$

$r(K, C) = \log(det(K_{C,C})).$ where $K_{C,C}$ is the sub-matrix of the kernel matrix K corresponding to the indices of C. Finally, let $l(K,C)=L(C)+r(K,C)$ The prototype set configuring unit 120 selects a data instance that maximizes the value of a cost function of the prototype through the kernel matrix as a prototype. The prototype set configuring unit 120 may repeat the selection of the prototype until prototypes of the number corresponding to the first ratio of the number of data instances of the entire dataset is selected. The prototype set configuring unit 120 may add the selected prototypes to the first set.

The prototype set configuring unit 120 may automatically determine the number of prototypes to an appropriate level compared to the number of total data instances by selecting prototypes of the number corresponding to the first ratio of the number of data instances of the entire dataset.

In addition, the criticism set configuring unit 130, among the remaining data instances other than the prototypes included in the first set of the data instances of the entire dataset 1, may extract the instance that maximizes the value of the cost function of the criticism. The criticism set configuring unit 130 may repeat adding a criticism to the second set until criticisms of the number corresponding to the second ratio of the number of prototypes of the first set are included in the second set, or the evaluation value of the second set calculated using the kernel matrix of the entire dataset is less than or equal to the threshold.

The criticism set configuring unit 130 may automatically determine the ratio of the number of prototypes to the number of criticisms to an appropriate level by selecting the criticisms corresponding to the second ratio of the number of prototypes.

Equation 3 below describes the operation of the prototype set configuring unit 120 and the criticism set configuring unit 130 in the form of pseudo code.

[Equation 3]

Given index sets P, C, CandC=Ø, thresholds $t_c$, and percentages p, $p_c$, do {
(1) Choose $k=\text{arginax}_{j \in [n] \setminus P}(J_b(P \cup \{j\}))$, and let $P=P \cup \{k\}$
} while $|P| < np$
(2) CandC=[n]\P)
do {
(3) Choose $k=\text{argmax}_{j \in CandC \setminus C}(l(K, C \cup \{j\}))$, and $C=C \cup \{k\}$
} while $l(K,C)-l(K, C \setminus \{k\}) > t_\varepsilon$ and $|C| < |P| \cdot p_c$ The prototype/criticism set storing unit 140 may store data for the first set and data for the second set. The data for the first set may include the data instance indexes of each prototype, and the data for the second set may include the data instance indexes of each criticism.

The rationale calculation unit 150 may calculate each feature based rationale for the output data for the first data instance of the model by inquiring the data stored in the prototype/criticism set storing unit 140 and considering all the prototypes included in the first set and all the criticisms included in the second set. In the calculation process of the feature based rationale, the rationale calculation unit 150 may inquire the output data when inputting the target data instance or the modified data instance, in which the value of a specific feature of the target data instance is increased by the modified distance ($\varepsilon$), to the model f(2), and obtain the output data as a response.

With reference to FIG. 3, the operation of the rationale calculation unit 150 will be described in detail. The rationale calculation unit 150 includes a plurality of logics. Each of the constituting logics 1500, 1502, 1504, 1505, 1506, and 1508 may be implemented as each functional unit of software, and may be executed on a processor to be described with reference to FIG. 8.

The rationale calculation unit 150 calculates each feature based rationale. For example, when the data instance consists of a total of three features, the rationale calculation unit 150 may calculate a first feature based rationale, calculate a second feature based rationale, and calculate a third feature based rationale. Hereinafter, a process, in which the rationale calculation unit 150 calculates the feature based rationale of the feature i (i.e., the i-th feature), will be described.

The modified data instance relative distance determination logic 1500 calculates the relative distance $D_R(x+\varepsilon ei)$ between the data points that all the prototypes of the first set and all the criticisms of the second set form in a feature space, and the data point of the modified data instance, in which the value of feature i among the features of the target data instance is increased by $\varepsilon$. Referring to Equation 4 below, the relative distance $D_R(x+\varepsilon ei)$ is the maximum value of the kernel function value of the point of the prototype on the feature space and the point of criticism, and the point of the modified data instance. The more similar the two input parameters to each other, the kernel function outputs a higher function value. And thus, the relative distance $D_R(x+\varepsilon ei)$ can be understood a value expressing how close the modified data instance is to the distribution of the entire dataset.

$$D_R(x) = \max_{z \in P \cup C} k(x, z) \qquad \text{[Equation 4]}$$

(Where P is the first set of prototypes and C is the second set of criticisms)

The model output difference determination logic 1502 between the modified data instance and the target data instance calculates $\text{Diff}_i(f, x, \varepsilon)$, which is a model output difference value between the modified data instance, in which the value of feature i among the features of the target data instance is increased by E, and the target data instance.

$$\text{Diff}_i(f, x, \in) = |f(x + (\max(i) - \min(i)) \cdot \in e_i) - f(x)| \qquad \text{[Equation 5]}$$

The modified data instance evaluation value calculation logic 1504 calculates an evaluation value for the modified data instance by aggregating the relative distance and the difference. For example, the modified data instance evaluation value calculation logic 1504 may calculate the evaluation value by multiplying the relative distance and the difference (see Equation 6).

The evaluation value of the modified data instance may be calculated to be higher as the relative distance of the modified data instance is shorter and the model output difference between the modified data instance and the target data instance is greater.

$$D_R(x + \in e_i) \cdot \text{Diff}_i(f, x, \in) \qquad \text{[Equation 6]}$$

The modified data instance evaluation value adjustment logic 1504 may adjust the calculated evaluation value so that the calculated evaluation value decreases as the modified distance $\varepsilon$ increases. For example, the modified data instance evaluation value adjustment logic 1504 may adjust the calculated evaluation value by multiplying the result of Equation 6 and the weight $\omega(\varepsilon)$ (see Equation 7). It may be understood that $\omega(\varepsilon)$ is a weighting function whose value converges to 0 as the absolute value of $\varepsilon$ increases, and outputs a value always larger than 0. By multiplying the result of Equation 6 and the weight $\omega(\varepsilon)$, the closer the modified data instance to the target data instance, the more important the evaluation value may be considered.

$$\omega(\in) \cdot D_R(x + \in e_i) \cdot \text{Diff}_i(f, x, \in), \qquad \text{[Equation 7]}$$

The modified distance ($\varepsilon$) setting logic 1506 may calculate a plurality of evaluation values by repeating the step of calculating the relative distance while changing the E, the step of calculating the difference, and the step of calculating the evaluation value. For example, the modified distance ($\varepsilon$) setting logic 1506 may change the modified distance ($\varepsilon$) so that $C_i(x)$ of Equation 8 is calculated. $C_i(x)$ in Equation 8 may be understood as indicating the influence of the i-th feature on the determination of the model f output of the target data instance.

$C_i(x)$ is calculated to be higher, as the modified data instance, in which the value of the i-th feature of the target data instance is changed, is more similar to the prototypes and criticisms of the entire dataset, and the difference between the model output of the target data instance and the model output of the modified data instance is larger. That is, when it is highly likely to exist as an actual data instance even if the value of the i-th feature of the target data instance is changed, and the output of the model is significantly changed if the value of the i-th feature of the target data instance is changed, it can be seen that the i-th feature had a great influence on determining the output of the model.

$$C_i(x) = \int_{\in = \frac{\min(i) - x_i}{\max(i) - \min(i)}}^{\frac{\max(i) - x_i}{\max(i) - \min(i)}} \omega(\epsilon) \cdot D_R(x + \epsilon e_i) \cdot \text{Diff}_i(f, x, \epsilon) d\epsilon \qquad \text{[Equation 8]}$$

The feature i rationale data calculation logic 1508 calculates the feature i based rationale by scaling the influence of the i-th feature on the determination of the model f output of the target data instance by using the influence of all features.

$$R_i(x) = \frac{C_i(x)}{\sum_{j=1}^{p} C_j(x)} \qquad \text{[Equation 9]}$$

Equation 10 below expresses the entire operation of the rationale calculation unit 150 as an equation. The rationale calculation unit 150 may be implemented using a program code, in which the following equation is implemented. $R_i(x)$, which is a value the rationale calculation unit 150 finally outputs, is the rationale for generating the output data of the model f for the data instance x, and indicates the influence of the feature i on the output data.

Given a model function $f$ and a point $x =$ [Equation 10]
$(x_i, \ldots, x_p)$ in the feature space, (1) for each $i$, compute $$C_i(x) = \int_{\epsilon=\frac{min(i)-x_i}{max(i)-min(i)}}^{\frac{max(i)-x_i}{max(i)-min(i)}} \omega(\epsilon) \cdot D_R(x + \epsilon e_i) \cdot Diff_i(f, x, \epsilon) d\epsilon,$$

where $\omega(\epsilon) : \mathbb{R} \to$ $\mathbb{R}_{>0}$ is the weight function satisfying $\lim_{\epsilon \to \pm\infty} \omega(\epsilon) = 0$.

(2) for each $i$, compute the $i$-th Rationale by $$R_i(x) = \frac{C_i(x)}{\sum_{j=1}^{p} C_j(x)}$$

Next, another exemplary system configuration of the present embodiment will be described with reference to FIG. 4. As shown in FIG. 4, the user terminal may access the machine-learned model based inference device 200 through a network and request an output value of the model for the target data instance. In response to the request, the inference device 200 inputs the features of the target data instance to the machine-learned model, and generates the determination result content by using the data output from the model.

In addition, the inference device 200 may request the XAI providing device 300 each feature based rationale value for the output data for the target data instance of the model. Before the inference device 200 requests the rationale value, the target data instance requested from the user terminal may be added to the entire dataset 1. The XAI providing device 300 may be a computing device having the XAI module described with reference to FIGS. 1 to 3.

In FIG. 4, the inference device 200 and the XAI providing device 300 are illustrated as physically separate devices, but if necessary, the inference device 200 and the XAI providing device 300 may be implemented as an internal module of one physical computing device. In addition, the entire dataset 1 may be stored in a separate storage device physically separated from the XAI providing device 300, or may be stored in the XAI providing device 300.

The inference device 200 may receive each feature based rationale value of the output data for the target data instance of the model from the XAI providing device 300 and generate the rationale content for the determination result content. The inference device 200 may generate data of an output screen including the determination result content for the target data instance and the rationale content in the user terminal. The output screen will be exemplarily described with reference to FIGS. 5 to 6.

FIG. 5 is an example of an output screen 500 that may be displayed on a display of a user terminal according to some embodiments of the present disclosure. It is assumed that the machine-learned model receives a face photo and infers the gender. When the user selects the image submit button 510 to input the face photo 540, the data of the face photo 540 is transmitted to the inference device 200.

The inference device 200 may extract a feature set after performing pre-processing according to a pre-implemented method in the face photo. As already described, the feature set is referred to as the data instance in the disclosure. When the inference device 200 inputs the data instance of the face photo 540 to the machine-learned gender inference model in advance, the gender inference model will output a confidence score of each of the male class and the female class.

In addition, the inference device 200 generates the result content 520 of the gender determination by using the confidence score of each class. The output screen 500 according to the present embodiment may generate not only the result of gender determination, but also the rationale content 530 through the XAI.

Assuming that the gender inference model receives a total of four features, and the top two features that provide a high rationale for the output of the gender inference model for the target data instance transmitted from the user terminal are feature #1 550 and feature #2 560, the rationale content 530 as shown in FIG. 5 may be displayed.

Of course, in some embodiments, as shown in FIG. 6, the rationale content 535 may be generated to display low features that had little influence on the output of the gender inference model for the target data instance transmitted from the user terminal. In some other embodiments, the rationale content may be generated to display both top features that provided a high rationale for the output of the gender inference model and low features that had little influence on the output of the gender inference model.

So far, the configuration and operation of the explainable artificial intelligence providing system according to some embodiments of the present disclosure have been described with reference to FIGS. 1 to 6.

Hereinafter, an explainable artificial intelligence providing method according to another embodiment of the present disclosure will be described. The explainable artificial intelligence providing method according to the present embodiment may be performed by the XAI module or the XAI providing device described with reference to FIGS. 1 to 4. The explainable artificial intelligence providing method according to the present embodiment may be divided and performed by a plurality of computing devices. Hereinafter, in describing the explainable artificial intelligence providing method according to the present embodiment, the description of the subject of each operation may be omitted, and in this case, it may be understood that the subject of the operation is a computing device.

In addition, the technical ideas that can be understood through the embodiments described with reference to FIGS. 1 to 6 can be naturally applied to the explainable artificial intelligence providing method according to the present embodiment, even if there is no special mention. Accordingly, the details described with reference to FIGS. 1 to 6 will not be repeated through this embodiment. Hereinafter, this embodiment will be described with reference to FIG. 7.

In step S100, a kernel matrix is constructed using the entire dataset. In step S102, a first set including prototypes selected from among data instances of the entire dataset using the kernel matrix, and a second set including criticisms selected from among remaining data instances other than the prototypes included in the first set among data instances of the entire dataset are set. It may be understood that the first set and the second set are samples expressing a data distribution of the entire dataset.

Next, a first process, in which when a target data instance is input to the machine-learned model, each feature based rationale for the inference result output accordingly is calculated, will be described.

In step S104, a modified data instance, in which the value of the current evaluation target feature is increased by ε among the features of the first data instance, is generated, and in step S106, an evaluation value for the modified data instance is calculated. The evaluation value may be a value obtained by multiplying a relative distance between the data point of the first set and the data point of the second set, and the data point of the modified data instance, and a different between output data for the first data instance of the model and output data for the modified data instance of the model.

By changing the modified distance ($\varepsilon$) and updating the modified data instance in steps S108 and S110, calculation of evaluation values for the updated modified data instance is repeated (S104 and S106).

Next, a second process, in which when a target data instance is input to the machine-learned model, each feature based rationale for inference result output accordingly is calculated, will be described. In this process, the relative distance between the data points that all prototypes of the first set and all the criticisms of the second set form on a feature space, and the data point of the modified data instance, in which the value of the first feature of features of the first data instance is increased by E, is calculated, and the difference between the output data for the first data instance of the model and the output data for the modified data instance of the model is calculated. In addition, an integral value for the $\varepsilon$ of the evaluation value for the modified data instance calculated using the relative distance and the difference may be calculated as the influence of the first feature on the output data for the first data instance of the model.

In this case, the integral value for the $\varepsilon$ of the evaluation value for the modified data instance is calculated in the range between (MIN–(value of the first feature of the first data instance))/(MAX–MIN) and (MAX–(value of the first feature of the first data instance))/(MAX–MIN), so that $\varepsilon$ can be prevented from being set beyond the existence range of the actual data instance.

In addition, an integral value for the $\varepsilon$ of the adjusted evaluation value, which is adjusted so that the evaluation value for the modified data instance decreases as the increases, may be calculated Next, in step S112, the evaluation values for the different modified data instances are aggregated to calculate the influence of the current evaluation target feature. When the next feature still remains (S114, S115), steps S104, S106, S108, S110, and S112 are repeatedly performed to calculate the influence of the next feature.

In step S116, the influence of each feature is scaled, and in step S118, the rationale content of model inference for the target data instance may be generated using the scaled influence of each feature. Next, in step S120, data of the output screen including the rationale content may be generated, and the data of the output screen may be transmitted to the user terminal.

The technical idea of the present disclosure described with reference to FIGS. 1 to 7 so far may be implemented as computer-readable codes on a computer-readable medium. The computer-readable recording medium may be, for example, a removable recording medium (CD, DVD, Blu-ray disk, USB storage device, removable hard disk) or a fixed recording medium (ROM, RAM, computer-equipped hard disk). The computer program recorded in the computer-readable recording medium may be transmitted to another computing device through a network such as the Internet and installed in the other computing device, thereby being used in the other computing device.

Hereinafter, a hardware configuration of an exemplary computing device according to some embodiments of the present invention will be described with reference to FIG. 8.

FIG. 8 is a hardware configuration diagram of an exemplary computing device 100.

The exemplary computing device 1000 may include one or more processors 1100, a bus 1600, a communication interface 1200, a memory 1400, which loads a computer program 1500 executed by the processors 1100, and a storage 1300 for storing the computer program 1500. However, FIG. 8 illustrates only the components related to the embodiment of the present disclosure. Therefore, it will be appreciated by those skilled in the art that the present disclosure may further include other general purpose components in addition to the components shown in FIG. 8.

The computing device 1000 may be, for example, a hardware implementation result of the XAI providing device 300 described with reference to FIG. 4.

The processor 1100 controls overall operations of each component of computing device 1000. The processor 1100 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1100 may perform calculations on at least one application or program for executing a method/operation according to various embodiments of the present disclosure. The computing device 1000 may have two or more processors.

The memory 1400 stores various data, instructions and/or information. The memory 1400 may load one or more programs 1500 from the storage 1300 to execute methods/operations according to various embodiments of the present disclosure. An example of the memory 1400 may be a RAM, but is not limited thereto.

The bus 1600 provides communication between components of computing device 1000. The bus 1600 may be implemented as various types of bus such as an address bus, a data bus and a control bus.

The communication interface 1200 supports wired and wireless internet communication of the computing device 1000. The communication interface 1200 may support various communication methods other than internet communication. To this end, the communication interface 1200 may be configured to include a communication module well known in the art of the present disclosure.

The storage 1300 can non-temporarily store one or more computer programs 1500. The storage 1300 may be configured to include a non-volatile memory, such as a flash memory, a hard disk, a removable disk, or any type of computer readable recording medium well known in the art.

The computer program 1500 may include one or more instructions, on which the methods/operations according to various embodiments of the present disclosure are implemented. When the computer program 1500 is loaded on the memory 1400, the processor 1100 may perform the methods/operations in accordance with various embodiments of the present disclosure by executing the one or more instructions.

The exemplary computer program 1500 may include an instruction for configuring a first set of prototypes representing each data instance of the entire dataset input to the model, an instructions for configuring a second set of criticisms that are samples of data instances not expressed by the prototypes among each data instance of the entire dataset, and an instruction for calculating a first feature based rationale for output data for the first data instance of the model by considering all prototypes included in the first set and all criticisms included in the second set.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method performed on a computing device for providing explainable artificial intelligence (XAI), the method comprising:

receive, from a user terminal, a rationale data request;

inputting, based on the rationale data request, an entire dataset into a machine-learned model;

configuring a first set of prototypes representing each instance of data instances of the entire dataset input to the machine-learned model;

configuring a second set of criticisms that are samples of other data instances not expressed by the first set of prototypes from among the data instances of the entire dataset;

calculating a first feature based rationale of output data for a first data instance of the machine-learned model by considering all prototypes included in the first set of prototypes and all criticisms included in the second set of criticisms;

generating determination result content for the first data instance by using the output data for the first data instance by the machine-learned model;

generating rationale content for the determination result content by using the first feature based rationale of the output data, wherein the rationale content indicates at least one top feature having a first influence on the determination result content and at least one low feature having a second influence on the determination result content lower than the first influence, the at least one top feature being selected from a top feature of a list of first feature based rationales in descending order of rationale values of all features of the entire dataset, and the at least one low feature being selected from a bottom feature of the list of first feature based rationales in descending order of rationale values of all features of the entire dataset;

generating output data to be output in an output screen of the user terminal, the output data including the determination result content and the rationale content; and providing, based on the rationale data request, the output data to the user terminal.

2. The method of claim 1, wherein the configuring of the first set of prototypes comprises:

configuring the first set of prototypes to include a first number of prototypes corresponding to a first ratio of the first number of prototypes to a third number of the data instances of the entire dataset; and

wherein the configuring of the second set of criticisms comprises:

repeating adding a criticism to the second set of criticisms until a second number of criticisms in the second set of criticisms corresponds to at least one of a second ratio of the first number of the prototypes in the first set of prototypes to the second number of criticisms of the second set of criticisms, or an evaluation value of the second set of criticisms calculated using a kernel matrix of the entire dataset is less than or equal to a threshold.

3. The method of claim 1, wherein the calculating of the first feature based rationale comprises:

calculating a relative distance between data points that all the prototypes of the first set of prototypes and all the criticisms of the second set of criticisms form on a feature space, and a data point of a modified data instance, in which a value of a first feature among features of the first data instance is increased by a modified distance;

calculating a difference between the output data for the first data instance of the machine-learned model and output data for the modified data instance of the machine-learned model;

calculating an evaluation value for the modified data instance by aggregating the relative distance and the difference;

calculating a plurality of evaluation values by repeating calculating the relative distance while changing the modified distance, calculating the difference, and calculating the evaluation value; and calculating the first influence of the first feature on the output data for the first data instance of the machine-learned model by aggregating the plurality of evaluation values.

4. The method of claim 3, wherein the calculating of the first feature based rationale further comprises:

calculating the first feature based rationale by scaling the first influence of the first feature using influence of all features.

5. The method of claim 3, wherein the calculating of the plurality of evaluation values comprises:

calculating the plurality of evaluation values by repeating the calculating of the relative distance while changing the modified distance in a range between (MIN−(the value of the first feature of the first data instance))/(MAX−MIN) and (MAX−(the value of the first feature of the first data instance))/(MAX−MIN), the calculating of the difference, and the calculating of the evaluation value, wherein the MAX is a maximum value of values of the first feature of the data instances of the entire dataset, and the MIN is a minimum value of values of the first feature of the data instances of the entire dataset.

6. The method of claim 3, wherein the calculating of the evaluation value for the modified data instance comprises:

calculating an adjusted evaluation value by adjusting the calculated evaluation value so that the calculated evaluation value decreases as the modified distance increases; and wherein the calculating of the plurality of evaluation values comprises:

calculating a plurality of adjusted evaluation values by repeating the calculating of the relative distance while changing the modified distance, the calculating of the difference, and the calculating of the adjusted evaluation value.

7. The method of claim 1, wherein the calculating of the first feature based rationale comprises:

calculating a relative distance between data points that all the prototypes of the first set of prototypes and all the criticisms of the second set of criticisms form on a feature space, and a data point of a modified data instance, in which a value of a first feature among features of the first data instance is increased by a modified distance;

calculating a difference between the output data for the first data instance of the machine-learned model and output data for the modified data instance of the machine-learned model; and calculating an integral value for the modified distance of an evaluation value for the modified data instance calculated using the relative distance and the difference as the first influence of the first feature on the output data for the first data instance of the machine-learned model.

8. The method of claim 7, wherein the calculating of the integral value for the modified distance comprises:

calculating the integral value for the modified distance of the evaluation value for the modified data instance in a range between (MIN−(the value of the first feature of the first data instance))/(MAX−MIN) and (MAX−(the value of the first feature of the first data instance)/(MAX−MIN), and wherein the MAX is a maximum value of values of the first feature of the data instances of the entire dataset, and the MIN is a minimum value of values of the first feature of the data instances of the entire dataset.

9. The method of claim 7, wherein the calculating of the integral value for the modified distance comprises:

calculating the integral value for the modified distance of an adjusted evaluation value adjusted so that the evaluation value for the modified data instance decreases as the modified distance increases.

10. An apparatus for providing explainable artificial intelligence, the apparatus comprising:

one or more processors;

a memory for loading a computer program executed by the one or more processors and data of a machine-learned model; and a storage for storing the computer program;

wherein the computer program, when executed by the one or more processors, cause the apparatus to:

receive, from a user terminal, a rationale data request;

input, based on the rationale data request, an entire dataset into the machined-learned model;

configure a first set of prototypes representing each instance of data instances of the entire dataset input to the machine-learned model;

configure a second set of criticisms that are samples of other data instances not expressed by the first set of prototypes from among the data instances of the entire dataset;

calculate a first feature based rationale for output data for a first data instance of the machine-learned model by considering all prototypes included in the first set of prototypes and all criticisms included in the second set of criticisms;

generate determination result content for the first data instance by using the output data for the first data instance by the machine-learned model;

generate rationale content for the determination result content by using the first feature based rationale of the output data, wherein the rationale content indicates at least one top feature having a first influence on the determination result content exceeding a first threshold and at least one low feature having a second influence on the determination result content lower than the first influence, the at least one top feature being selected from a top feature of a list of first feature based rationales in descending order of rationale values of all features of the entire dataset, and the at least one low feature being selected from a bottom feature of the list of first feature based rationales in descending order of rationale values of all features of the entire dataset;

generate output data to be output in an output screen of the user terminal, the output data including the determination result content and the rationale content; and provide, based on the rationale data request, the output data to the user terminal.

\* \* \* \* \*